United States Patent
Kubo et al.

(10) Patent No.: US 7,896,234 B2
(45) Date of Patent: Mar. 1, 2011

(54) SYSTEM AND METHOD FOR AUTHORIZING ELECTRONIC PAYMENT TRANSACTIONS

(75) Inventors: Takayuki Kubo, Harrenberg (DE); Norbert Albrecht, Berlin (DE)

(73) Assignee: First Data Corporation, Greenwood Village, CO (US)

( * ) Notice: Subject to any disclaimer, the term of this patent is extended or adjusted under 35 U.S.C. 154(b) by 280 days.

(21) Appl. No.: 12/174,228

(22) Filed: Jul. 16, 2008

(65) Prior Publication Data

US 2008/0281733 A1 Nov. 13, 2008

Related U.S. Application Data

(63) Continuation of application No. 11/428,487, filed on Jul. 3, 2006, now Pat. No. 7,413,119.

(30) Foreign Application Priority Data

Jun. 6, 2005 (EP) .................................. 05012141

(51) Int. Cl.
*G06F 17/60* (2006.01)
(52) U.S. Cl. ....................... 235/379; 235/380
(58) Field of Classification Search ................. 235/379, 235/380, 382, 375; 705/44, 35, 39
See application file for complete search history.

(56) References Cited

U.S. PATENT DOCUMENTS

| | | | |
|---|---|---|---|
| 5,679,940 A | 10/1997 | Templeton et al. | |
| 6,254,000 B1 | 7/2001 | Degen et al. | |
| 6,862,559 B1 | 3/2005 | Hogg | |
| 7,413,119 B2 * | 8/2008 | Kubo et al. | 235/379 |
| 2002/0091646 A1 | 7/2002 | Lake et al. | |
| 2002/0194119 A1 | 12/2002 | Wright et al. | |
| 2003/0028481 A1 | 2/2003 | Flitcroft et al. | |
| 2003/0174823 A1 | 9/2003 | Justice et al. | |

OTHER PUBLICATIONS

U.S. Appl. No. 11/428,487, filed Jul. 3, 2006.

* cited by examiner

*Primary Examiner*—Daniel St. Cyr
(74) *Attorney, Agent, or Firm*—Kilpatrick Townsend & Stockton LLP

(57) ABSTRACT

A transaction authorization system comprises an authorization engine (18) configured to perform an analysis in relation to a received request for authorization of a current electronic payment transaction and generate an authorization output based on the analysis, and a database (22) storing a plurality of transaction records for past electronic payment transactions. The authorization engine is configured to:
- access the database to determine one or more distribution functions based on at least some of the stored transaction records,
- determine one or more intermediate values in relation to the received authorization request based on the one or more distribution functions,
- determine a conditional probability in relation to the one or more intermediate values based on at least some of the stored transaction records, the conditional probability indicative of a probability of a predetermined transaction result under the condition of the one or more intermediate values, and
- generate the authorization output based on the determined conditional probability.

13 Claims, 1 Drawing Sheet

SYSTEM AND METHOD FOR AUTHORIZING ELECTRONIC PAYMENT TRANSACTIONS

CROSS REFERENCE TO RELATED APPLICATIONS

This application is a continuation of U.S. patent application Ser. No. 11/428,487 of Kubo et al., entitled "System and method for authorizing electronic payment transactions" and filed Jul. 3, 2006, the entire disclosure of which is hereby incorporated herein by reference.

BACKGROUND OF THE INVENTION

The present invention relates to a system and method for authorizing electronic payment transactions.

As used herein, the term "payment transaction" is to be understood as referring to an action or set of actions having as its goal the electronic transfer of money or other values from a payor's account to a payee's account. "Electronic transaction" means a transaction that is conducted, in whole or in part, by electronic means or electronic records. The transaction may be conducted using wireless and/or wired communications technology. For example, the Internet, a public switched telephone network, a wide area network, a local area network, a virtual private network, and other types of communications networks and/or links may be utilized for performing an electronic payment transaction.

Electronic payment transactions frequently require authorization by a designated entity prior to execution of the transaction. The authorization entity may perform some form of analysis related to the requested transaction and, depending on the result of the analysis, render a decision whether to decline or authorize the payment transaction. The quality of the analysis is determinative of the error rate of the decision. That is, the better the analysis, the smaller the number of transactions that were erroneously approved and also the smaller the number of transactions that were erroneously declined.

Erroneous decisions by a payment transaction authorization entity may give rise to increased signal traffic and data processing. For example, erroneous approval of a payment transaction request may result in reversal of the authorized transaction after execution thereof. Reverse transactions stemming from erroneous authorizations cause additional signal traffic and consume additional processing time and resources in the communications and data processing infrastructure used for processing the electronic payment transactions. In view of the finite computing and routing capacity of existing computer network systems, there is a high desire to keep unnecessary signal traffic and data processing caused by erroneous decisions of a payment transaction authorization entity low.

BRIEF SUMMARY OF THE INVENTION

It is therefore an object of the present invention to provide a transaction authorization system and method which allow to achieve improved decision reliability to thereby prevent increased load on existing computing and network resources.

To achieve the above object, the present invention provides a transaction authorization system, comprising:
  an authorization engine configured to perform an analysis in relation to a received request for authorization of a current electronic payment transaction and generate an authorization output based on the analysis,
  a database storing a plurality of transaction records for past electronic payment transactions, wherein the authorization engine is configured to:
  access the database to determine one or more distribution functions based on at least some of the stored transaction records,
  determine one or more intermediate values in relation to the received authorization request based on the one or more distribution functions,
  determine a conditional probability in relation to the one or more intermediate values based on at least some of the stored transaction records, the conditional probability indicative of a probability of a predetermined transaction result under the condition of the one or more intermediate values, and
  generate the authorization output based on the determined conditional probability.

The present invention also provides a transaction authorization method, comprising:
  receiving a request for authorization of a current electronic payment transaction,
  providing a database storing a plurality of transaction records for past electronic payment transactions,
  accessing the database to determine one or more distribution functions based on at least some of the stored transaction records,
  determining one or more intermediate values in relation to the received authorization request based on the one or more distribution functions,
  determining a conditional probability in relation to the one or more intermediate values based on at least some of the stored transaction records, the conditional probability indicative of a probability of a predetermined transaction result under the condition of the one or more intermediate values, and
  generating an authorization output based on the determined conditional probability.

The term "engine" as used herein refers to a mechanism implemented by suitable hardware and/or software and designed to perform one or more predefined processes.

In one embodiment of the present invention, the electronic payment transactions are card-initiated transactions where "card" refers to a card-shaped means of making electronic payments. Debit cards and credit cards are conventionally known examples of payment cards. The payment card may include, in computer-readable form, information identifying an account of the card holder. This information may be stored, e.g., in a magnetic strip provided on the card or a chip integrated into the card. Card terminals located at merchant sites may be configured to read the identification information from customer's payment cards.

Various payment methods have been devised and implemented on the basis of machine-readable payment cards. Among them, a signature-based electronic debit payment method and an identification code-based electronic debit payment method have attained widespread acceptance by market participants.

In identification code-based debit payment, the card holder enters a personal identification number (PIN) into a keypad or keyboard of a card terminal. In an online version of the PIN payment method, the PIN number is transmitted via an online connection to an electronic authorization center of the card issuing bank along with such information as an account identifier identifying the card holder's account and the amount due. The bank's authorization center checks the PIN number and also whether the account has sufficient funds to collect the requested amount. If the card is valid and sufficient funds are available, the authorization center effects payment, and an "ok" message is sent to the terminal. Otherwise, the authorization center declines payment. There is also known an offline version of PIN-based debit payment where the PIN number is checked by the card at the point of sale (POS) and may be checked, alternatively or additionally, by the authorization center of the card issuing bank at a later time not correlated with the time of input of the PIN by the card holder.

In signature-based debit payment, no PIN is entered by the card holder to confirm the payment. Instead, the card holder provides a signature on a receipt printed by the terminal. The terminal reads the card holder's account data from the card's magnetic strip or chip and stores the read information along with the amount due in a payment data set. This data set may thereafter be forwarded to the issuing bank of the debit card to collect the amount due from the card holder's account.

The above signature-based debit payment method may be enhanced by an online authorization check. To this end, the terminal sends a request message including the account data read from the debit card to an authorization entity which checks whether the requested transaction can be authorized. The authorization entity may hold a list of stolen or otherwise prohibited debit cards for which no payment approval must be allowed. Typically, the authorization entity has no access to account information of the card holders and thus has no knowledge as to whether or not a specific requestor's account holds sufficient funds. The authorization entity may be implemented on a remote computer system communicably coupled to the terminal via a wide area network, the Internet or a public telecommunications network, for example. Alternately, the authorization entity may be coupled to the terminal through a local are network, which may, e.g., be a proprietary computer network of a merchant.

A person versed in the art will readily understand that the above identification code-based and signature-based debit payment methods are not limited to a card shape of the payment means, but can be used in connection with a machine-readable payment means of any shape and size. The present invention is therefore not to be understood as being limited to payment cards, but envisages the use of differently shaped and sized, machine-readable payment means.

Moreover, while the transaction authorization system and method of the present invention are preferably intended for use in authorizing requests for signature-based debit payment transactions, a person of ordinary skill in the art will appreciate that the transaction authorization system and method of the present invention may also be useful in connection with other types of payment transactions, which may, or may not, rely on portable, machine-readable payment means. For example, there is known a cardless debit payment method in which a payor uses a graphical user interface displayed on a display device of a computer terminal to enter his or her account information and, possibly, additional data and confirms the payment electronically by clicking on a button or providing a digital signature. An electronic payment transaction occurring as part of such a cardless payment method may represent another embodiment of a payment transaction that can be authorized by the system and method of the present invention. It is further to be noted that the present invention may find application also with respect to payment methods other than debit payment methods. For example, it is conceivable to use the present invention for the authorization of cheque-based payment transactions.

An authorization system responsible for authorizing electronic payment transactions may have no, or no immediate, access to account information of a payor in the transaction. Decisions of the authorization system are then subject to uncertainty and may prove erroneous. For example, it may occur that an authorization system for signature-based debit payment transactions or other "PIN-less" payment transactions grants a payment request not knowing that the payor's account lacks sufficient funds. In such a case, a reverse transaction may follow in order to re-collect a balance that may have already been credited to the payee's account. It has been found that such reverse transactions may cause considerable signal traffic and consume considerable computing power in existing payment transaction processing infrastructure, which signal traffic and computing power could be saved and is otherwise utilized if a more reliable authorization decision was available. Here, "authorization decision" generally refers to the decision output by the authorization system, whether positive, negative or anything between.

To achieve a more reliable authorization decision, the authorization engine in the transaction authorization system of the present invention may access a database that contains a history log of electronic payment transactions to derive information on a characteristic pattern or patterns that can be found in past transactions recorded in the database.

In one embodiment, the database may only contain transaction records that all stem from payment transactions of a same type. In this case, the authorization engine will determine one or more distribution functions only on the basis of past payment transactions of one type. For example, a signature-based debit payment transaction can be viewed as one type of payment transaction, an identification code-based debit payment transaction can be viewed as another type of payment transaction, and a cheque-based payment transaction can be viewed as yet another type of payment transaction.

In an alternate embodiment, the database may contain transaction records for payment transactions of two or more different types. In such a case, the authorization engine may determine the distribution functions on the basis of past payment transactions of a selected single type only or may use transaction records relating to different types of payment transactions. As an example, the authorization engine may determine the distribution functions based on transaction records for signature-based debit payment transactions and transaction records for identification code-based debit payment transactions.

Each transaction record in the database will include a plurality of data fields that may contain various transaction-related information. One or more of the data fields may serve to indicate an outcome of the transaction such as if the transaction was authorized or rejected and/or if it could be completed successfully and/or if it was annulled through a reverse transaction. Other data fields may serve to contain such transaction parameters as a payor account identifier, a transaction time, a transaction date, a transaction amount, location information, an identification code of a terminal used for initiating the transaction, etc.

The one or more distribution functions determined by the authorization engine may be indicative of the frequency or probability distribution of such transaction attributes as the transaction amount, the transaction time, the transaction date, a difference between the times or dates of two successive transactions for the same payor account, the geographical location of a terminal from which a transaction authorization request was received, and an identification code of such a terminal. The authorization engine may determine one or more distribution functions for each of a plurality of payor accounts individually, and may also determine one or more distribution functions for one or more groups of payor accounts. As a mere example, the authorization engine may determine individual transaction amount frequency distribution functions for numerous payor accounts, which individual transaction amount frequency distribution functions indicate the (absolute or relative) frequency distribution of the transaction amount in past payment transactions for each individual of the payor accounts. Additionally, the authorization engine may determine an average transaction amount frequency distribution function indicating the frequency distribution of the transaction amount in past payment transactions for all of the payor accounts collectively, i.e., when taken as a group.

Based on distribution functions such as above, the authorization engine determines one or more intermediate values in relation to the received authorization request. The intermediate values preferably include at least one current transaction probability, which is determined by the authorization engine by identifying one or more transaction attributes associated with the received authorization request and determining a probability for each transaction attribute on the basis of an individual frequency distribution function determined for that transaction attribute for the same payor account as identified in the received authorization request.

The intermediate values preferably further include at least one relative entropy, which is determined by the authorization engine on the basis of an individual frequency distribution function for one or more transaction attributes associated with the received authorization request and an average frequency distribution function for each transaction attribute. The relative entropy can, e.g., be determined according to the so-called Kullback-Leibler divergence, which is a measure for the dissimilarity of two distributions over the same random variable.

The authorization engine uses the intermediate values to determine a conditional probability that indicates a probability of a predetermined transaction result under the condition of the intermediate values. The conditional probability is derived by the authorization engine based on the content of the database. Specifically, the authorization engine performs a statistical evaluation on a set of transaction records stored in the database to determine what was the probability in the past for the predetermined transaction result to occur, given the same or substantially the same intermediate values as a condition. The set of transaction records included in the statistics may comprise the entire number of records stored in the database or a selected sub-set therefrom. For example, the authorization engine may use transaction records from only a predetermined most recent period of time when determining the conditional probability. Alternately, the authorization engine may use a predetermined number of most recent transaction records only.

The predetermined transaction result may be successful completion or failure of the transaction. Accordingly, the conditional probability determined as above represents a score for the likelihood of success or failure of the requested transaction, which score is obtained by comparing the requested current transaction with a characteristic pattern or patterns observed in past transactions. It has been found that the use and evaluation of history data for authorizing currently requested payment transactions in the above manner can greatly improve the reliability of the authorization decision and consequently reduce overall signal traffic related to payment processing.

The authorization system of the present invention may comprise a host server configured to receive authorization requests for first-type payment transactions and second-type payment transactions, forward the authorization requests for first-type payment transactions to the authorization engine, and route the authorization requests for second-type payment transactions to a remote further transaction authorization system. The host server is coupled to the database and is configured to register a transaction record for every requested first-type payment transaction and every requested second-type payment transaction in the database.

A computer-readable information storage medium in accordance with the present invention includes stored program code means adapted to effect, when executed by a computer system, execution of the methodology discussed above. The information so storage medium may, e.g., be in the form of an optical or magnetic disk storing the program code means. The program code means can also be available in the form of a signal transmitted in a communications system. The signal may be an electric or electromagnetic signal transmitted through wired or wireless media and representing a sequence of instructions forming the program code means.

BRIEF DESCRIPTION OF THE DRAWINGS

The invention will be explained further by way of non-limiting and purely illustrative example in conjunction with the accompanying drawings, in which.

DETAILED DESCRIPTION OF THE INVENTION

Figure 1:
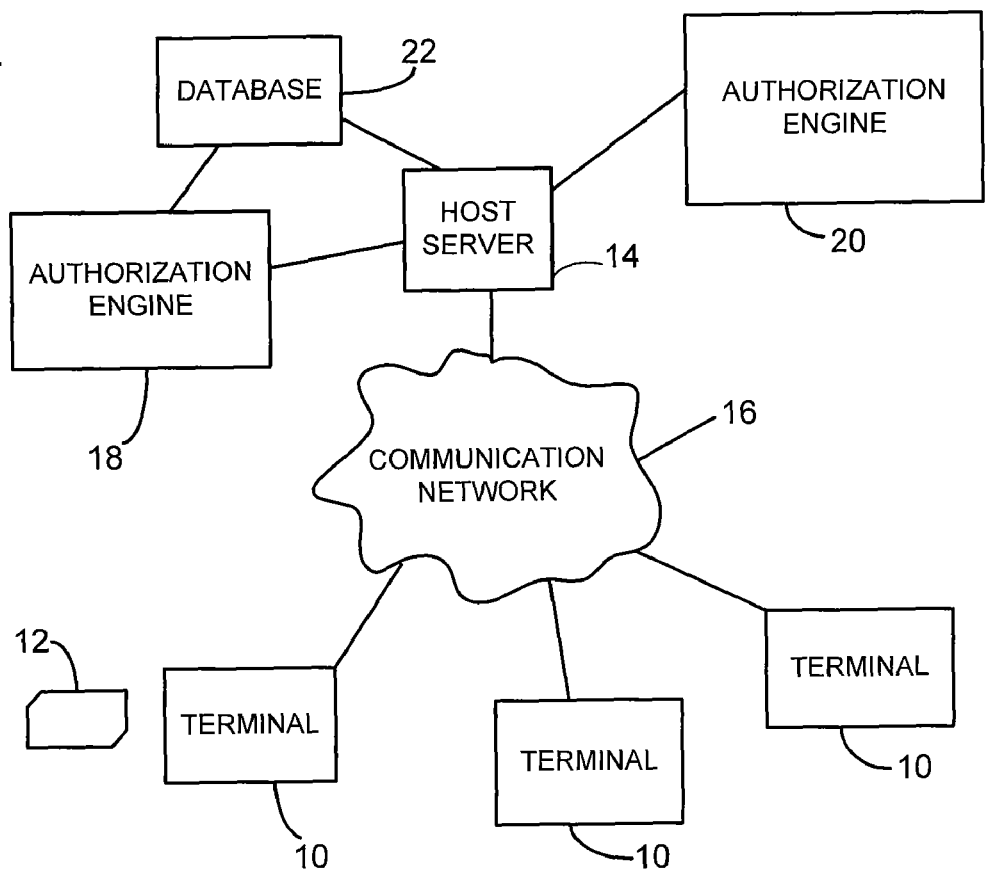
FIG. 1 illustrates a schematic block diagram of a portion of an exemplary architecture for processing electronic card payment transactions.

In FIG. 1, a plurality of card terminals 10 are depicted, which are configured to read stored information from a payment card such as schematically indicated at 12. The terminals 10 may be located at the site of one or more merchants. In a debit payment method, the read information may include account data consisting of an account number of the holder of the card and a bank identification code. The terminals 10 are communicably coupled to a host server 14 across a communications network 16. The host server 14 is communicably coupled to a first authorization engine 18 and one or more second, remotely located authorization engines 20.

The communications network 16 may include, e.g., at least one of a land-line public switched telephone network, a mobile communications network such as according to the GMS or UTMS standard or any other conventionally known mobile communications standard, the Internet, a proprietary communications network, a wide area network, etc.

The first authorization engine 18 is destined to check incoming authorization requests for first-type payment transactions, whereas the one or more second authorization engines 20 are destined to check incoming authorization requests for second-type payment transactions. Such first-type and second-type payment transactions represent alternative ways of transferring a payment amount. The following is description specifically envisages a scenario where signature-based debit card payment transactions are first-type payment transactions and PIN-based debit card payment transactions are second-type payment transactions. In such a scenario, the first authorization engine 18 may have no access to account information of debit card holders, while the one or more second authorization engines 20 have access to such account information, enabling them to determine whether a requested payment amount can be collected from a card holder's account.

One or more of the card terminals 10 may be configured to support signature-based debit card payment transactions only. One or more other card terminals 10 may be configured to support PIN-based debit card payment transactions only. Some of the card terminals 10 may be configured to support both signature-based debit card payment transactions and PIN-based debit card payment transactions.

In a signature-based debit card payment method with online authorization, a terminal 10 reads account data from a debit card and establishes a communication connection with the host server 14. The terminal transmits an authorization request message to the host server 14 via the communication connection. Included in the authorization request message are the account data read from the debit card and possibly further information. The host server 14 receives the authorization request message and forwards it to the first authorization engine 18. The first authorization engine 18 checks the authorization request online and returns a response message, which is transmitted via the host server 14 to the requesting terminal 10. The response message includes an authorization decision based on the result of the analysis performed by the first authorization engine 18.

After receipt of the response message from the first authorization engine 18, the terminal 10 or host server 14 may transmit a debit data set including all relevant transaction data to a bank's payment processing system to settle the outstanding debt. In case of insufficient funds on the card holder's account, the card issuing bank may electronically decline to debit the balance due to the card holder's account. This may result in the merchant's bank annulling a credit it may already have posted on so the merchant's account. It will be easily appreciated by one of ordinary skill in the art that the signal traffic involved in such a reverse transaction could be avoided if the authorization decision from the first authorization engine 18 was more reliable.

In a PIN-based debit card payment method, a terminal 10 similarly transmits an is authorization request message to the host server 14. The authorization request message additionally includes a PIN input by the card holder at the terminal. The host server 14 is programmed to route the message to the second authorization engine 20 (or, if plural second authorization engines 20 are provided, an appropriate one of the plural systems). The second authorization engine 20 checks the PIN and also whether the card holder has sufficient funds in his or her account. It returns a response message, which is transmitted via the host server 14 to the requesting terminal. The response message contains information as to whether or not the requested transaction is approved or rejected. Such information may be in the form of an answer code, the value of which indicates the decision of the second authorization engine 20.

A database 22 is shown in FIG. 1 which stores a history log of at least some of the debit card payment transactions that are processed via the host server 14. The transactions recorded in the database 22 preferably include both PIN-based payment transactions and signature-based payment transactions. The database 22 may be maintained by the host server 14, which may update the database 22 whenever it receives an authorization request message for a new PIN-based or signature-based debit card payment transaction.

The history log in the database 22 comprises a transaction record for each registered payment transaction. Each transaction record includes a plurality of transaction parameters related to the respective payment transaction. These parameters may include the transaction time, transaction date and transaction amount, a merchant type (category) code, a merchant country code, a location of the requesting terminal, a terminal identification code, etc. Each terminal 10 has its own unique terminal identification code, which it transmits as part of a transaction authorization request whenever a payment transaction is initiated from the terminal.

Each transaction record further includes account information of a payor in the respective transaction. This account information may be comprised of the card holder's account number, a bank identification code, and possibly further data. Moreover, each transaction record includes a data field which serves to receive information on whether or not the respective transaction was successful or was rejected or annulled. In the case of PIN-based transactions, this data field may indicate the answer code returned by the second authorization engine 20. In the case of signature-based transactions, it may indicate if the transaction was approved or rejected by the first authorization engine 18 and—in case of approval—if the is transaction was later annulled by a reverse transaction. Information on such reverse transactions may, e.g., be forwarded to the host server 14 from a bank's transaction processing system (not shown in the FIG. 1) involved in processing (and possibly reversing) the respective signature-based transaction.

The database 22 is accessible to the first authorization engine 18. One of the functionalities of the first authorization engine 18 is to perform a statistical evaluation on part or all of the data stored in the database 22. To this end, the first authorization engine 18 is designed to carry out a process of performing such statistics. Based on the statistics, the first authorization engine 18 may determine a score for a requested signature-based payment transaction, wherein the score indicates a likelihood of failure or successful completion of the requested transaction.

The statistics performed by the first authorization engine 18 include the determination of individual frequency distribution functions $F\{PAN, A_i, n_j\}$ for various transaction attributes for each of a plurality of payor accounts. In the above expression, F represents the transaction frequency, PAN represents the payor account, $A_i$ represents the transaction attribute, and $n_j$ represents a value or range of values (bin) of the transaction attribute $A_i$. $F\{PAN, A_i, n_j\}$ thus indicates the number of transactions for a given payor account PAN where the value of the transaction attribute $A_i$ belongs to the "bin" $n_j$. Assuming a number L of different transaction attributes for which the first authorization engine 18 determines respective frequency distribution functions, the index i satisfies $1 \leq i \leq L$. Further, assuming a number N of different bins or ranges into which the value of the attribute $A_i$ may fall, the index j satisfies $1 \leq j \leq N$.

In a preferred embodiment, the first authorization engine 18 determines individual frequency distribution functions for one or more of the following transaction attributes: transaction amount, transaction time, transaction date, difference between the transaction time of two successive transactions for the same payor account, difference between the transaction date of two successive transactions for the same payor account, and terminal identification code.

In order to determine the individual frequency distribution functions, the first authorization engine 18 searches the database 22 for transaction records for a specific payor account. Valid transaction records may be required to have been registered within a predetermined most recent period of time or be among a predetermined number of most recent records.

Such requirements, however, are merely optional, and valid transaction records may be taken from the entire set of records recorded in the database 22.

Figure 2:
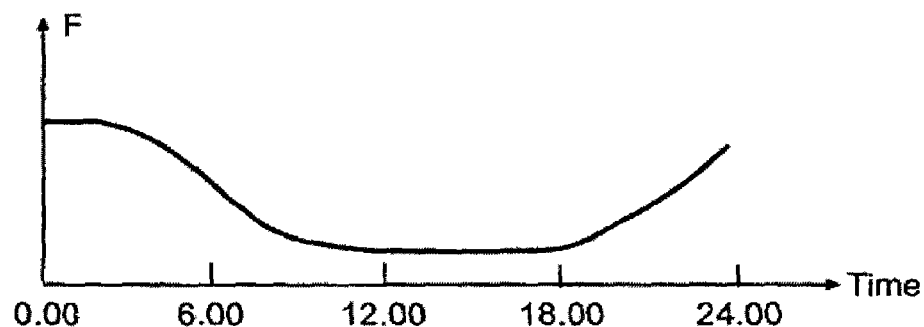
FIG. 2 shows an exemplary individual frequency distribution function illustrating a frequency distribution for the transaction attribute 'transaction time' obtained from a plurality of fictitious payment transactions for an individual payor account.

Based on the transactions records found, the first authorization engine 18 analyses them to determine the distribution of each transaction attribute of interest among the records. An exemplary (fictitious) individual frequency distribution function for the transaction attribute 'transaction time' is illustrated in FIG. 2. This figure indicates a higher transaction frequency during nighttime than during daytime, revealing that the holder of the payment card has a tendency to make payments at night.

The first authorization engine 18 further determines at least one average frequency distribution function $F_{av}\{A_i, n_j\} = \Sigma_{PAN} F\{PAN, A_i, n_j\}$ for each transaction attribute of interest. The average frequency distribution function represents the frequency distribution of the respective transaction attribute in transactions for a group of payor accounts. The group may include all payor accounts for which transactions are recorded in the database 22. Alternately, the group may be defined by one or more predetermined selection criteria. One selection criterion may relate to geographical location. For example, the first authorization engine 18 may determine an average frequency distribution function for a specific transaction attribute for all payor accounts held with banks in a specific country. The account information included in the transaction records may indicate the particular country. Alternatively or additionally, the first authorization engine 18 may determine an average frequency distribution function for a specific transaction attribute for all payor accounts found in a set of registered transactions that occurred in a specific country. The merchant country code in the transaction records may serve as indicator in which country a transaction occurred. Another selection criterion may relate to the merchant category. Using such a selection criterion, the first authorization engine 18 may determine an average frequency distribution function for a specific transaction attribute for all payor accounts found in a set of recorded transactions that relate to a specific category of merchant.

Figure 3:
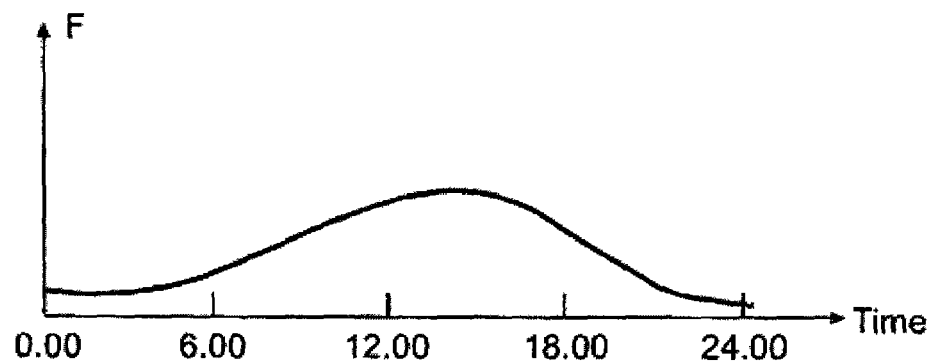
FIG. 3 shows an exemplary average frequency distribution function illustrating a frequency distribution for the transaction attribute 'transaction time' obtained from a plurality of fictitious payment transactions for a group of payor accounts.

In the above manner, the first authorization engine 18 can determine one or more to average frequency distribution functions (depending on the applicable group selection criteria) in relation to each transaction attribute of interest. FIG. 3 illustrates an exemplary (fictitious) average frequency distribution function for the transaction attribute 'transaction time'. One can see that this function shows a higher transaction frequency during daytime than during nighttime. In other words, more payment transactions were effected during the day than at night in the selected set of registered transactions based on which the function of FIG. 3 was determined.

The first authorization engine 18 may re-determine the individual and average frequency distribution functions at regular time intervals or whenever a predetermined number of transactions have been newly recorded in the database 22. It can store the distribution functions thus determined in suitable memory (not illustrated in FIG. 1).

The first authorization engine 18 is further designed to analyze a current authorization request for a signature-based payment transaction and determine the value of one or more transaction attributes of the requested transaction. Preferably, the first authorization engine 18 determines the value of one or more of the following transaction attributes: requested transaction amount, time of the current transaction, date of the current transaction, transaction time difference between the current transaction and an immediately previous transaction for the same payor account, transaction date difference between the current transaction and the immediately previous transaction for the same payor account, and identification code of the terminal 10 from which the current authorization request was transmitted. The transaction amount will be indicated in the received authorization request, as will be the terminal identification code. The time and date of the current transaction may also be indicated in the received authorization request or may be determined by the host server 14 or the first authorization engine 18 using an internal clock or time reference. The time and date of an immediately previous transaction for the same payor account as indicated in the received authorization request can be determined by the first authorization engine 18 by searching the database 22 for a most recent transaction record of that payor account.

Based on the thus determined attribute values for the requested current transaction and further based on the individual frequency distribution functions determined as above, the first authorization engine 18 is designed to determine a probability $P\{PAN, A_i\}$ in relation to each transaction attribute of interest for the payor account indicated in the received authorization request according to the following formula:

$$P\{PAN, A_i\} = F\{PAN, A_i, n^*\} / \Sigma_j F\{PAN, A_i, n_j\}$$

where n* represents a bin into which the value of the transaction attribute $A_i$ of the requested current transaction falls. $P\{PAN, A_i\}$ thus represents a probability for the is transaction attribute $A_i$ to have a value falling into bin n* in a payment transaction for a specific payor account, given the individual frequency distribution function $F\{PAN, A_i, n_j\}$ for that transaction attribute for the same payor account. In other words, the probability $P\{PAN, A_i\}$ is a measure for the match between the transaction attribute $A_i$ of the requested current transaction and the past pattern for that transaction attribute. The greater the value of $P\{PAN, A_i\}$, the better does the transaction attribute $A_i$ of the requested current transaction match the past pattern. Conversely, the smaller the value of $P\{PAN, A_i\}$, the less does the transaction attribute $A_i$ of the requested current transaction match the past pattern.

Furthermore, based on the individual and average frequency distribution functions, the first authorization engine 18 determines a relative entropy $H\{PAN, A_i\}$ in relation to each transaction attribute of interest for the payor account indicated in the received authorization request the according to following formula:

$$H\{PAN, A_i\} = \Sigma_j F\{PAN, A_i, n_j\} \times \log[F\{PAN, A_i, n_j\} / F_{av}\{A_i, n_j\}]$$

The above relative entropy $H\{PAN, A_i\}$ is a measure for the dissimilarity between the payor account's individual frequency distribution function $F\{PAN, A_i, n_j\}$ for the transaction attribute $A_i$ and the average frequency distribution function $F_{av}\{A_i, n_j\}$ for that transaction attribute. It corresponds to what is referred to as Kullback-Leibler divergence in the art of information theory. A person of ordinary skill in the art will readily appreciate that any other entropy measure for the similarity between the payor account's individual frequency distribution function $F\{PAN, A_i, n_j\}$ and the average frequency distribution function $F_{av}\{A_i, n_j\}$ can be used.

The first authorization engine 18 thus determines two intermediate values in relation to each transaction attribute of interest, one indicating a probability for the specific value of the transaction attribute in the requested current transaction to occur in view of the same payor account's past pattern (i.e., $P\{PAN, A_i\}$) and another indicating the degree of match between the past pattern of the specific payor account indicated in the authorization request and an average past pattern of a group of payor accounts for the same transaction attribute (i.e., $H\{PAN, A_i\}$). In a preferred embodiment, more than one transaction attribute will be considered by the first authorization engine 18. Accordingly, the number of intermediate values to be determined by the first authorization engine 18 will be greater than two. For example, the transaction amount, time and date, the terminal identification code and is the time and date differences between two successive transactions for the same payor account may all be considered as relevant transaction attributes by the first authorization engine 18. In this case, the first authorization engine 18 determines twelve intermediate values in relation to an incoming transaction authorization request.

One will understand that the number two of intermediate values to be determined by the first authorization engine 18 in relation to each transaction attribute of interest is a mere example and not intended to be limiting to the present invention. In a simple embodiment, it may suffice for the first authorization engine 18 to determine individual frequency distribution functions and, based thereon, a current probability in relation to each transaction attribute of interest. In such as case, only one intermediate value will result in relation to each transaction attribute of interest. In other embodiments, additional measures may have to be determined by the first authorization engine 18 in response to an incoming transaction authorization request so that the number of intermediate values to be determined for each transaction attribute of interest may be three or more.

The first authorization engine 18 not only determines, and updates, the individual and average frequency distribution functions, but further determines at least one conditional probability distribution $P\{TR|P[A_1], P[A_2], \ldots, P[A_i], H[A_1], H[A_2], \ldots, H[A_i]\}$ based on at least some of the transaction records in the database 22. In the above expression, TR represents a predetermined transaction result such as failure or successful completion, $P[A_i]$ represents a probability for the occurrence of a specific value of the transaction attribute $A_i$ and $H[A_i]$ represents a relative entropy related to the transaction attribute $A_i$. The expression $P\{TR|P[A_1], P[A_2], \ldots, P[A_i], H[A_1], H[A_2], \ldots, H[A_i]\}$ thus represents the conditional probability for the occurrence of the predetermined transaction result under the condition that the probability and entropy parameters $P[A_1], P[A_2], \ldots, P[A_i], H[A_1], H[A_2], \ldots, H[A_i]$ assume certain values. In simple words, the conditional probability distribution $P\{TR|P[A_1], P[A_2], \ldots, P[A_i], H[A_1], H[A_2], \ldots, H[A_i]\}$ indicates what was in the past the probability of a positive or negative outcome of a transaction when the current probabilities for specific values of the transaction attributes $A_1, A_2, \ldots, A_i$ were $P[A_1], P[A_2], \ldots, P[A_i]$ and when the current relative entropies associated with these transaction attributes had the values $H[A_1], H[A_2], \ldots, H[A_i]$.

In one embodiment, the first authorization engine 18 determines conditional probability distributions in relation to individual ones of the payor accounts that appear in the transaction records in the database 22. In this case, the conditional probability distribution indicates what was in the past the probability of a positive or negative outcome of a transaction for a specific payor account when the current probabilities for specific values of the transaction attributes $A_1, A_2, \ldots, A_i$ were $P[A_i], P[A_2], \ldots, P[A_i]$ for that payor account (based on individual frequency distribution functions determined for that payor account) and when the current relative entropies associated with these transaction attributes had the values $H[A_1], H[A_2], \ldots, H[A_i]$ for that payor account (based on individual and average frequency distribution functions determined for that payor account).

In another embodiment, the first authorization engine 18 may determine one or more global conditional probability distributions in relation to respective groups of payor accounts. In that case, the conditional probability distribution indicates what was in the past the probability of a positive or negative outcome of a transaction in a group of payor accounts when the current probabilities for specific values of the transaction attributes $A_1, A_2, \ldots, A_i$ were $P[A_1], P[A_2], \ldots, P[A_i]$ in that group and when the current relative entropies associated with these transaction attributes had the values $H[A_1], H[A_2], \ldots, H[A_i]$ in that group.

The conditional probability distributions can be determined by the first authorization engine 18 in different ways. One, although potentially consuming much computational power, is exact calculation, which is based on counting the number of occurrences of various attribute values and transaction outcomes in the records in the database 22. Other ways, which may be computationally more feasible, resort to methods of predictive modeling and may employ Naive Bayes networks or neural networks, which are generally known to those skilled in the art.

Each conditional probability distribution can be determined by the first authorization engine 18 in the form of a multi-dimensional table (matrix) including a plurality of conditional probabilities. The first authorization engine 18 stores each conditional probability distribution in suitable memory and may re-determine it statically at regular, predetermined time intervals or dynamically whenever a predetermined number of new transactions (any new transactions or only transactions for a specific payor account or a specific group of payor accounts) has been registered in the database 22.

It has been indicated further above that the first authorization engine 18 determines a score for a requested signature-based payment transaction. In order to determine such score, the first authorization engine 18 accesses an appropriate one of the conditional probability distributions to determine a conditional probability corresponding to the intermediate values it determined in relation to the received authorization request. The conditional probability thus determined represents a likelihood that the requested signature-based transaction will fail or will be successfully completed. In one embodiment, the first authorization engine 18 may generate its authorization decision solely based on the determined conditional probability. To this end, it may compare the conditional probability with one or more predetermined threshold values and reject or approve the requested transaction depending on whether the conditional probability is below or above the threshold. The threshold value(s) may be adjustably set in the first authorization engine 18. There may be defined different threshold values for different merchant types, countries, payor accounts, etc.

In an alternate embodiment, the conditional probability determined in the above manner for the received authorization request may form a partial score value, which is combined with one or more other partial score values by the first authorization engine 18 in order to determine an authorization decision. The other partial score values may result from other checking procedures which the first authorization engine 18 may apply with regard to the requested transaction. One such other checking procedure may involve a comparison of the payor account indicated in the received authorization request with a stored negative list of prohibited accounts and/or a positive list of eligible lists to thereby determine whether the payor account identified in the request is blocked, e.g., due to fraudulent use of a payment card in the past. A partial score value resulting from such a check may thus indicate whether or not the payor account to which the authorization request is directed is prohibited or eligible.

The first authorization engine 18 may combine the various partial score values in a weighted manner as follows:

$$v = a_1 v_1 + a_2 v_2 + \ldots a_n v_n$$

wherein $v_1$ represents a first partial score value, $a_1$ represents a weight given to the first partial score value, $v_2$ represents the second partial score value, $a_2$ represents a weight given to the second partial score value, $v_n$ represents a n-th partial score value and $a_n$ represents a weight given to the n-th partial score value. The total value v thus obtained may then be returned by the first authorization engine 18 as an authorization result to the requesting terminal 10. Alternately, the first authorization engine 18 may perform a threshold comparison by comparing the total value v with one or more predetermined threshold values and return a "yes" or "no" decision as the authorization result based on the threshold comparison. Again, the threshold value(s) may be adjustably set in the first authorization engine 18 and there may be defined different threshold values for different merchant types, countries, payor accounts, etc.

As indicated further above, the number of intermediate values determined by the first authorization engine 18 may vary for different embodiments. In one embodiment, the first authorization engine 18 may only determine a probability for the specific value of each transaction attribute of interest in the requested current transaction. In another embodiment, the first authorization engine 18 may only determine a relative entropy in relation to each transaction attribute of interest. In a preferred embodiment, however, both types of intermediate value are determined by the first authorization engine 18 in relation to each transaction attribute of interest to allow for a higher quality of the score determined by the first authorization engine 18.

The invention claimed is:

1. A transaction authorization system, comprising:
an authorization engine configured to perform an analysis in relation to a received request for authorization of a current electronic payment transaction and generate an authorization output based on the analysis,
a database storing a plurality of transaction records for past electronic payment transactions,
wherein the authorization engine is configured to:
access the database to determine one or more distribution functions based on at least some of the stored transaction records,
determine one or more intermediate values in relation to the received authorization request based on the one or more distribution functions,
determine a conditional probability in relation to the one or more intermediate values based on at least some of the stored transaction records, the conditional probability indicative of a probability of a predetermined transaction result under the condition of the one or more intermediate values, and
generate the authorization output based on the determined conditional probability,
wherein the authorization engine is configured to determine one or more relative entropies in relation to the received authorization request based on one or more first and one or more second frequency distribution functions and determine the conditional probability based on the one or more relative entropies.

2. The transaction authorization system of claim 1,
wherein the authorization engine is configured to determine the one or more first frequency distribution functions in relation to each of a plurality of payor account identifiers based on stored transaction records having the respective payor account identifiers, the one or more first frequency distribution functions being indicative of the frequency distribution of one or more transaction attributes of electronic payment transactions associated with a respective payor account identifier.

3. The transaction authorization system of claim 2,
wherein the authorization engine is configured to determine one or more current transaction probabilities in relation to the received authorization request based on the one or more first frequency distribution functions and determine the conditional probability based on the one or more current transaction probabilities.

4. The transaction authorization system of claim 2,
wherein the one or more transaction attributes relate to at least one of the following:
a transaction amount, a transaction time, a transaction date, a difference between the times of two successive transactions, a difference between the dates of two successive transactions, a geographical location of a terminal from which a transaction authorization request was received, and an identification code of such a terminal.

5. The transaction authorization system of claim 1,
wherein the authorization engine is configured to generate the authorization output based on the result of a comparison of the conditional probability with one or more predetermined threshold values.

6. The transaction authorization system of claim 1,
further comprising a host server configured to receive authorization requests for first-type electronic payment transactions and second-type electronic payment transactions, forward the authorization requests for first-type payment transactions to the authorization engine, and route the authorization requests for second-type payment transactions to a remote further transaction authorization system, wherein the host server is coupled to the database and is configured to register a transaction record for every requested first-type payment transaction and every requested second-type payment transaction in the database.

7. A transaction authorization method, comprising:
receiving a request for authorization of a current electronic payment transaction,
providing a database storing a plurality of transaction records for past electronic payment transactions,
accessing the database to determine one or more distribution functions based on at least some of the stored transaction records,
determining one or more intermediate values in relation to the received authorization request based on the one or more distribution functions,
determining a conditional probability in relation to the one or more intermediate values based on at least some of the stored transaction records, the conditional probability indicative of a probability of a predetermined transaction results under the condition of the one or more intermediate values,
generating an authorization output based on the determined conditional probability, and
determining one or more relative entropies in relation to the received authorization request based on one or more first and one or more second frequency distribution functions and determining the conditional probability based on the one or more relative entropies.

8. The transaction authorization method of claim 7, comprising:

determining the one or more first frequency distribution functions in relation to each of a plurality of payor account identifiers based on stored transaction records having the respective payor account identifiers, the one or more first frequency distribution functions being indicative of the frequency distribution of one or more transaction attributes of electronic payment transactions associated with a respective payor account identifier.

9. The transaction authorization method of claim 8, comprising:

determining one or more current transaction probabilities in relation to the received authorization request based on the one or more first frequency distribution functions and determining the conditional probability based on the one or more current transaction probabilities.

10. The transaction authorization method of claim 8, wherein the one or more transaction attributes relate to at least one of the following:

a transaction amount, a transaction time, a transaction date, a difference between the times of two successive transactions, a difference between the dates of two successive transactions, a geographical location of a terminal from which a transaction authorization request was received, and an identification code of such a terminal.

11. The transaction authorization method of claim 7, comprising:

generating the authorization output based on the result of a comparison of the conditional probability with one or more predetermined threshold values.

12. The transaction authorization method of claim 7, comprising:

receiving, at a host server, authorization requests for first-type electronic payment transactions and second-type electronic payment transactions, forwarding the authorization requests for first-type payment transactions to the authorization engine, routing the authorization requests for second-type payment transactions to a remote further transaction authorization system, and registering, by the host server, a transaction record for every requested first-type payment transaction and every requested second-type payment transaction in the database.

13. A computer-readable information storage medium, the medium storing program code means adapted to effect, when executed by a computer system, execution of a method as claimed in claim 7.

* * * * *